United States Patent
Heo

(10) Patent No.: US 11,277,385 B2
(45) Date of Patent: Mar. 15, 2022

(54) DECENTRALIZED SOFTWARE-DEFINED NETWORKING METHOD AND APPARATUS

(71) Applicant: Electronics and Telecommunications Research Institute, Daejeon (KR)

(72) Inventor: Hwan Jo Heo, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 440 days.

(21) Appl. No.: 16/261,620

(22) Filed: Jan. 30, 2019

(65) Prior Publication Data

US 2019/0260714 A1    Aug. 22, 2019

(30) Foreign Application Priority Data

Feb. 19, 2018 (KR) .......................... 10-2018-0019425

(51) Int. Cl.
*H04L 29/06* (2006.01)
*H04L 12/947* (2013.01)
(Continued)

(52) U.S. Cl.
CPC .......... *H04L 63/0281* (2013.01); *H04L 41/06* (2013.01); *H04L 49/25* (2013.01)

(58) Field of Classification Search
CPC ............... H04L 2209/38; H04L 9/3239; H04L 67/1097; H04L 9/0643; H04L 9/0637; H04L 9/3236; H04L 67/1095; H04L 9/3297; H04L 2209/56; H04L 63/00; H04L 63/20; H04L 67/16; H04L 9/3263; H04L 2209/84; H04L 63/10; H04L 63/123; H04L 67/10; H04L 9/0894; H04L 9/3247; H04L 12/40169; H04L 41/147; H04L 41/5019; H04L 41/5025; H04L 49/10; H04L 49/25; H04L 63/0227; H04L 63/0428; H04L 63/0442; H04L 63/1416; H04L 63/1425;
(Continued)

(56) References Cited

U.S. PATENT DOCUMENTS

| | | | |
|---|---|---|---|
| 2015/0009800 A1* | 1/2015 | Koponen | G06F 11/2097 370/218 |
| 2015/0124647 A1 | 5/2015 | Jafarian et al. | |

(Continued)

FOREIGN PATENT DOCUMENTS

| | | |
|---|---|---|
| EP | 3 229 418 A1 | 10/2017 |
| KR | 10-2016-0022327 A | 2/2016 |

(Continued)

*Primary Examiner* — Djenane M Bayard
(74) *Attorney, Agent, or Firm* — NSIP Law

(57) ABSTRACT

Disclosed is a method of operating a software-defined network (SDN) controller located in a decentralized SDN including a plurality of SDN switches and a plurality of SDN controllers, the method including receiving a transaction including network event information from at least one SDN switch of the plurality of SDN switches, determining a block generation entity with at least one other SDN controller based on a consensus algorithm, and, when the SDN controller is determined as the block generation entity, generating a block including the transaction and propagating the block to the at least one other SDN controller and the plurality of SDN switches. Also, a corresponding method of operating a SDN switch is disclosed.

19 Claims, 5 Drawing Sheets

(51) Int. Cl.
*H04L 12/24* (2006.01)
*H04L 49/25* (2022.01)
*H04L 41/06* (2022.01)

(58) Field of Classification Search
CPC ....... H04L 69/04; H04L 9/006; H04L 9/0618;
H04L 9/0822; H04L 12/4641; H04L
12/66; H04L 2209/20; H04L 2209/30;
H04L 2209/42; H04L 2209/60; H04L
2209/80; H04L 2209/88; H04L 41/00;
H04L 41/042; H04L 41/06; H04L
41/0806; H04L 41/082; H04L 41/0853;
H04L 41/0893; H04L 41/0896; H04L
41/12; H04L 41/16; H04L 41/5006; H04L
41/5009; H04L 41/5051; H04L 41/5096;
H04L 43/065; H04L 43/0811; H04L
43/0829; H04L 45/245; H04L 45/38;
H04L 45/46; H04L 45/54; H04L 45/64;
H04L 45/7453; H04L 45/7457; H04L
49/15; H04L 49/356; H04L 49/357; H04L
63/0281; H04L 63/04; H04L 63/061;
H04L 63/08; H04L 63/0876; H04L
63/105; H04L 63/108; H04L 63/14; H04L
63/1458; H04L 63/164; H04L 67/00;
H04L 67/104; H04L 67/1059; H04L
67/1061; H04L 67/1093; H04L 67/125;
H04L 67/2804; H04L 67/306; H04L
67/42; H04L 69/22; H04L 69/326; H04L
69/40; H04L 9/008; H04L 9/08; H04L
9/085; H04L 9/088; H04L 9/0891; H04L
9/14; H04L 9/32; H04L 9/321; H04L
9/3226
See application file for complete search history.

(56) References Cited

U.S. PATENT DOCUMENTS

| | | |
|---|---|---|
| 2017/0026281 A1 | 1/2017 | Mogul et al. |
| 2017/0093825 A1 | 3/2017 | Park et al. |
| 2017/0257305 A1 | 9/2017 | Jin et al. |
| 2017/0353387 A1 | 12/2017 | Kwak et al. |
| 2019/0014124 A1* | 1/2019 | Reddy .................... H04L 63/108 |
| 2019/0065709 A1* | 2/2019 | Salomon .................. H04L 9/006 |
| 2019/0149429 A1* | 5/2019 | Stocker ................. H04L 67/104 |
| | | 709/225 |

FOREIGN PATENT DOCUMENTS

| | | |
|---|---|---|
| KR | 10-2016-0024762 A | 3/2016 |
| KR | 10-1678795 B1 | 11/2016 |
| KR | 10-2017-0081422 A | 7/2017 |

* cited by examiner

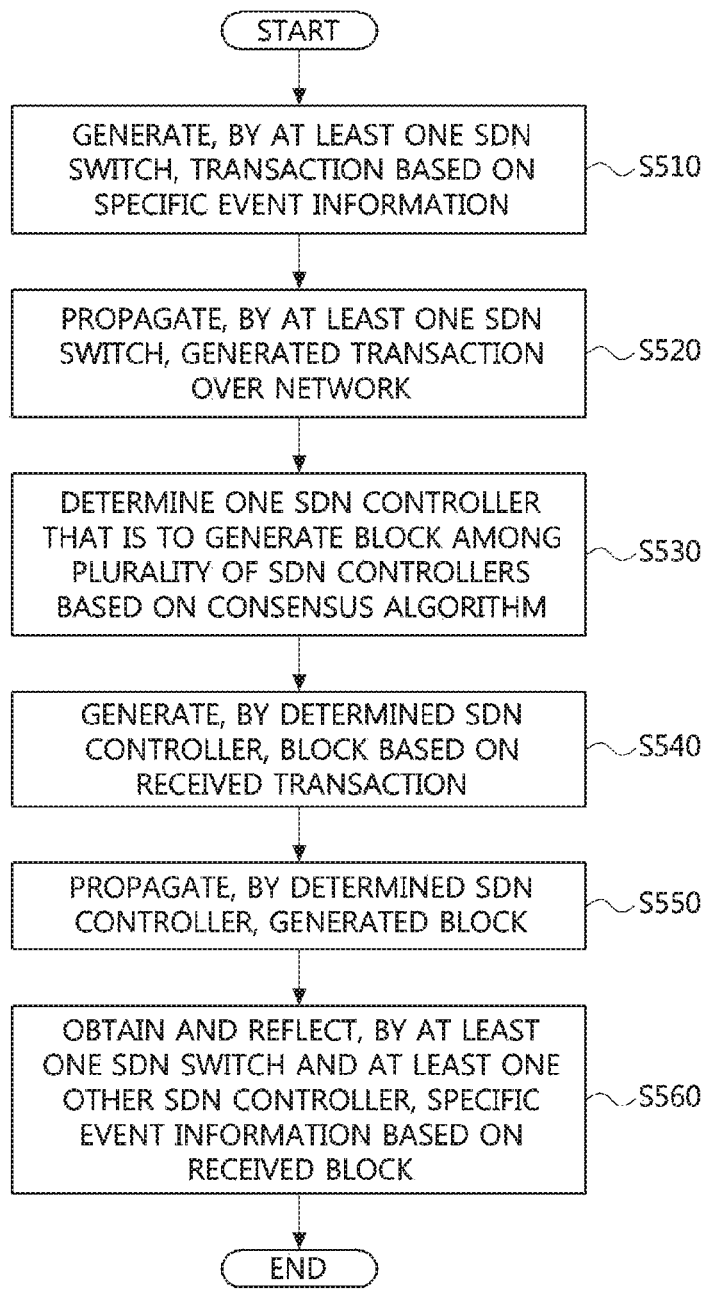

DECENTRALIZED SOFTWARE-DEFINED NETWORKING METHOD AND APPARATUS

CLAIM FOR PRIORITY

This application claims priority to Korean Patent Application No. 2018-0019425 filed on Feb. 19, 2018 in the Korean Intellectual Property Office (KIPO), the entire contents of which are hereby incorporated by reference.

BACKGROUND

1. Technical Field

Example embodiments of the present invention relate in general to a decentralized software-defined networking method and apparatus, and more specifically, to a software-defined networking method and apparatus which have network operating logic that is physically or logically decentralized.

2. Related Art

Software-defined networking (SDN) is a networking concept for actively operating a network in various fashions according to network operating logic that is implemented by separating the logic for operating a network from underlying packet delivery processes. However, the network operation logic should be executed by a centralized controller for consistency and agility of such logic, and thus it is not easy to scale-out or provide fault-tolerance.

Currently, research is being actively conducted to implement centralized network operating logic in a popular SDN controller framework using a cluster of physically or logically distributed SDN controllers. For example, in OpenDayLight (ODL), controllers decentralized by data storage sharding may achieve consensus on a leadership for each data shard using the Raft algorithm. In an open network operating system (ONOS), storage synchronization may be achieved in terms of strong or eventual consistency for each service.

However, such clustering of SDN controllers has three drawbacks. The first drawback is that byzantine faults are not tolerable. The currently available consensus algorithms, such as the Raft algorithm and the Kafka algorithm, are designed to tolerate fail-stop faults and accordingly do not tolerate byzantine faults that could be induced by attackers. The second drawback comes from the fact that the control communication channel is physically or logically separate and accordingly the control channel is susceptible to network partitioning. Once network is partitioned, it is difficult to guarantee availability and consistency at the same time. The third drawback is that provenance of the network state is not provided when a fault occurs. In particular, when a byzantine fault occurs due to a network attack, it is not easy to address problems through simple diagnostic logging because the provenance data can be even tampered with by an attacker.

SUMMARY

Accordingly, example embodiments of the present invention are provided to substantially obviate one or more problems due to limitations and disadvantages of the related art.

Example embodiments of the present invention provide a decentralized software-defined networking method.

Example embodiments of the present invention also provide a decentralized software-defined networking apparatus.

In some example embodiments, a method of operating a software-defined network (SDN) controller located in a decentralized SDN including a plurality of SDN switches and a plurality of SDN controllers includes receiving a transaction including network event information from at least one SDN switch of the plurality of SDN switches, determining a block generation entity with at least one other SDN controller based on a consensus algorithm, and when the SDN controller is determined as the block generation entity, generating a block including the transaction and propagating the generated block to the at least one other SDN controller and the plurality of SDN switches.

The method may further include, when the SDN controller is not determined as the block generation entity, receiving a block including the transaction.

The propagating of the generated block to the at least one other SDN controller and the plurality of SDN switches may include propagating the generated block using either a broadcast technique or a multicast technique.

The network event information may include at least one of information about disconnection of a specific link, information about a flow table miss of a specific packet, and information about a timer event.

The consensus algorithm may include at least one of a sequential selection method, a random selection method, a method of selecting a leader, and proof of work.

The block may further include at least one of network state information and a list of switch commands.

The receiving of the transaction including the network event information from the at least one SDN switch of the plurality of SDN switches may include generating a message based on the transaction through a controller proxy and receiving the network event information via the message.

When the SDN controller is determined as the block generation entity, the generating of the block including the transaction and the propagating of the generated block to the at least one other SDN controller and the plurality of SDN switches may include generating the block based on a message including a flow table through a controller proxy and propagating the block to the at least one other SDN controller and the plurality of SDN switches.

In other example embodiments, a method of operating a software-defined network (SDN) switch located in a decentralized SDN including a plurality of SDN switches and a plurality of SDN controllers includes, when obtaining network event information, propagating a transaction including the network event information to the plurality of SDN controllers; receiving a block including the transaction and a flow table from any one of the plurality of SDN controllers; and controlling traffic by reflecting the flow table.

The network event information may include at least one of information about disconnection of a specific link, information about a flow table miss of a specific packet, and information about a timer event.

The propagating of the transaction including the network event information to the plurality of SDN controllers when obtaining the network event information may include generating the transaction based on a message including the network event information and propagating the transaction to the plurality of SDN controllers through a switch proxy.

The receiving of the block including the transaction and the flow table from any one of the plurality of SDN controllers may include generating a message including the flow table based on the block through a switch proxy and receiving the flow table via the message.

In still other example embodiments, a software-defined network (SDN) controller located in a decentralized SDN including a plurality of SDN switches and a plurality of SDN controllers includes a processor and a memory storing at least one command which is executed through the processor, wherein the at least one command is executed to receive a transaction including network event information from at least one SDN switch of the plurality of SDN switches; determine a block generation entity with at least one other SDN controller based on a consensus algorithm; and, when the SDN controller is determined as the block generation entity, generate a block including the transaction and propagate the block to the at least one other SDN controller and the plurality of SDN switches.

When the SDN controller is not determined as the block generation entity, the at least one command may be executed to receive a block including the transaction.

The at least one command may be executed to propagate the generated block using either a broadcast technique or a multicast technique.

The network event information may include at least one of information about disconnection of a specific link, information about a flow table miss of a specific packet, and information about a timer event.

The consensus algorithm may include at least one of a sequential selection method, a random selection method, a method of selecting a leader, and proof of work.

The block may further include at least one of network state information and a list of switch commands.

In yet other example embodiments, a software-defined network (SDN) switch located in a decentralized SDN including a plurality of SDN switches and a plurality of SDN controllers includes a processor; and a memory storing at least one command which is executed through the processor, wherein the at least one command is executed to, when obtaining network event information, propagate a transaction including the network event information to the plurality of SDN controllers; receive a block including the transaction and a flow table from any one of the plurality of SDN controllers; and control traffic by reflecting the flow table.

The network event information may include at least one of information about disconnection of a specific link, information about a flow table miss of a specific packet, and information about a timer event.

BRIEF DESCRIPTION OF DRAWINGS

Example embodiments of the present invention will become more apparent by describing example embodiments of the present invention in detail with reference to the accompanying drawings, in which:

FIG. 5 is a flowchart illustrating operations of a decentralized software-defined networking method according to one embodiment of the present invention.

DESCRIPTION OF EXAMPLE EMBODIMENTS

Figure 1:
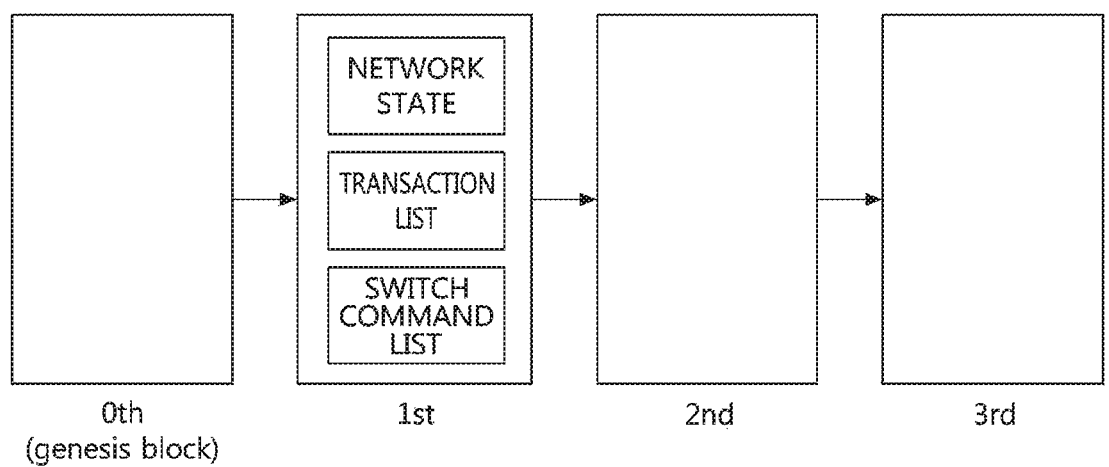
FIG. 1 is a diagram illustrating an architecture of a blockchain according to one embodiment of the present invention.

Example embodiments of the present invention are disclosed herein. However, specific structural and functional details disclosed herein are merely representative for purposes of describing example embodiments of the present invention, and example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, exemplary embodiments of the present invention will be described in detail with reference to the accompanying drawings.

FIG. 1 is a diagram illustrating an architecture of a blockchain according to one embodiment of the present invention.

A decentralized software-defined network (SDN) according to one embodiment of the present invention may refer to a network in which a plurality of decentralized SDN controllers and a plurality of SDN switches operate as blockchain nodes to exchange information with each other through propagation of transactions and blocks.

More specifically, the state of the network may be stored or recorded in a block generated by an SDN controller according to a predetermined period and forwarded to another SDN controller and SDN switch such that the state of the network can be shared.

Referring to FIG. 1, the block of the decentralized SDN according to one embodiment of the present invention may include information about a network state, information about a list of transactions included in a current block, and information about a list of commands for an SDN switch indicated by the current block. Here, the information about the network state, the information about the list of transactions, and the information about the list of commands for the SDN switch may be included in a body of the block but are not limited thereto because the pieces of information depend on the design of the block. Here, the list of commands for the SDN switch may refer to a flow table.

Blocks which are generated sequentially may be connected to a previously generated block, similarly to a typical blockchain. Here, the connection may be established in a manner in which the current block includes a hash value of the previous block, but the present invention is not limited thereto.

The blockchain may use a hash function. Due to a first preimage resistance, a second preimage resistance, and a collision resistance, which are properties of the hash function, it is difficult to calculate a preimage value. Accordingly, it may be difficult to tamper with the previous block. The present invention may provide tamper-resistant provenance for the network state information through the above-described blockchain.

A transaction may refer to any type of event that can change the state of the network. For example, when a specific link is disconnected in an SDN switch, the SDN switch may generate a transaction of the information about the link disconnection and propagate the transaction over the network. When an SDN controller receives the transaction, the SDN controller may determine to change the network state including the transaction when generating a block. According to the determination, a switch command to change a forwarding path of a specific flow may be generated.

As another example, when a packet is input to the SDN switch but a flow table miss occurs, a transaction may be generated for information about the corresponding event and propagated over the network. Upon receiving the transaction, the SDN controller may determine how to process the packet and then reflect the determination in the network state or generate a switch command. Here, the flow table miss may mean that a processing method for the packet input to the SDN switch is not found in the flow table of the SDN switch.

As another example, when a timer event (an event that occurs when a specific time is reached or has elapsed) occurs in the SDN controller, the SDN controller may generate a transaction of the event and propagate the transaction over the network. In generating a block, the SDN controller may determine to change the network state including the transaction of the event.

In the decentralized SDN according to one embodiment of the present invention, blocks may be generated by a plurality of SDN controllers. Here, when the plurality of SDN controllers generate blocks, various block generation methods or consensus algorithms which are used for a blockchain may be used.

For example, when there are n SDN controllers, the controllers may generate a block one after another in rotation. In other words, when the (i-1)-th block is generated by a specific SDN controller, the i-th block, which is the next block, may be generated by another SDN controller, and the SDN controller having generated the i-th block may verify or achieve consensus on the (i-1)-th block. Here, n and i may be any positive integers greater than 2.

As another example, a leader may be selected from among the plurality of SDN controllers and a block may be generated by the leader, as in the case of the Raft protocol. As another example, a proof-of-work method may be used to find a nonce value of a block that each SDN controller is to generate such that a block forming the longest chain can be determined as a blockchain on which consensus is achieved.

The information about the network state according to one embodiment of the present invention may generally include, but is not limited to, components constituting the network, services provided by the SDN controllers, and state information stored in an SDN application. The information about the network state may include any information about the network that is configured by the SDN controllers.

Figure 2:
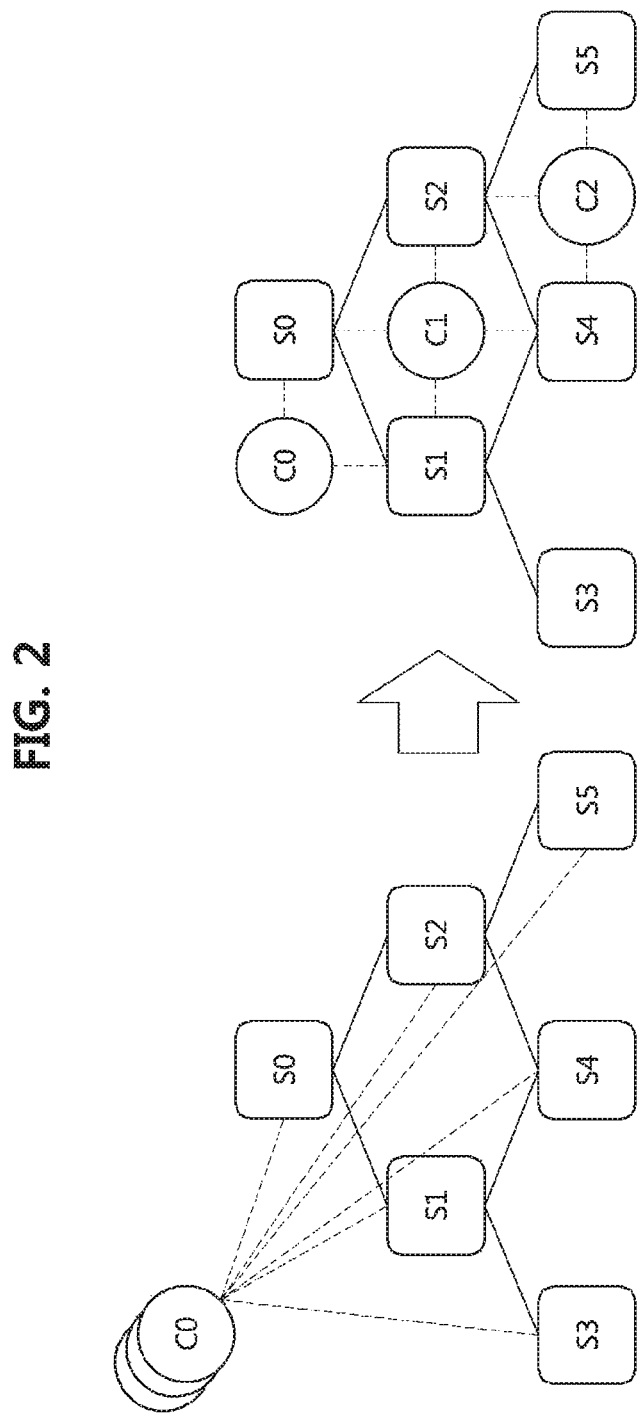
FIG. 2 is a diagram illustrating connections between controllers and switches in a conventional software-defined network structure and a decentralized software-defined network structure according to one embodiment of the present invention.

FIG. 2 is a diagram illustrating connections between controllers and switches in a conventional software-defined network structure and a decentralized software-defined network structure according to one embodiment of the present invention.

In FIG. 2, $S_0$ to $S_5$ may represent six SDN switches, and $C_0$ to $C_2$ may represent three SDN controllers. Referring to FIG. 2, each of the conventional decentralized SDN controllers are directly connected to all of the SDN switches. In other words, the SDN controllers and the SDN switches communicate using independent control channels (indicated by dotted lines).

However, in the decentralized SDN according to the embodiment of the present invention, the SDN controllers can be located anywhere on the network path, and there may be no distinction between a data channel and a control channel. Further, in the decentralized SDN, a transaction or a block may be generated and propagated to a plurality of neighboring nodes.

Here, the propagation may be performed using either a broadcast technique or a multicast technique but is not limited thereto. However, the present invention limits the propagation to the broadcast technique or multicast technique so that a message containing conflicting content is not delivered (not equivocative) when a specific switch is compromised.

Figure 3:
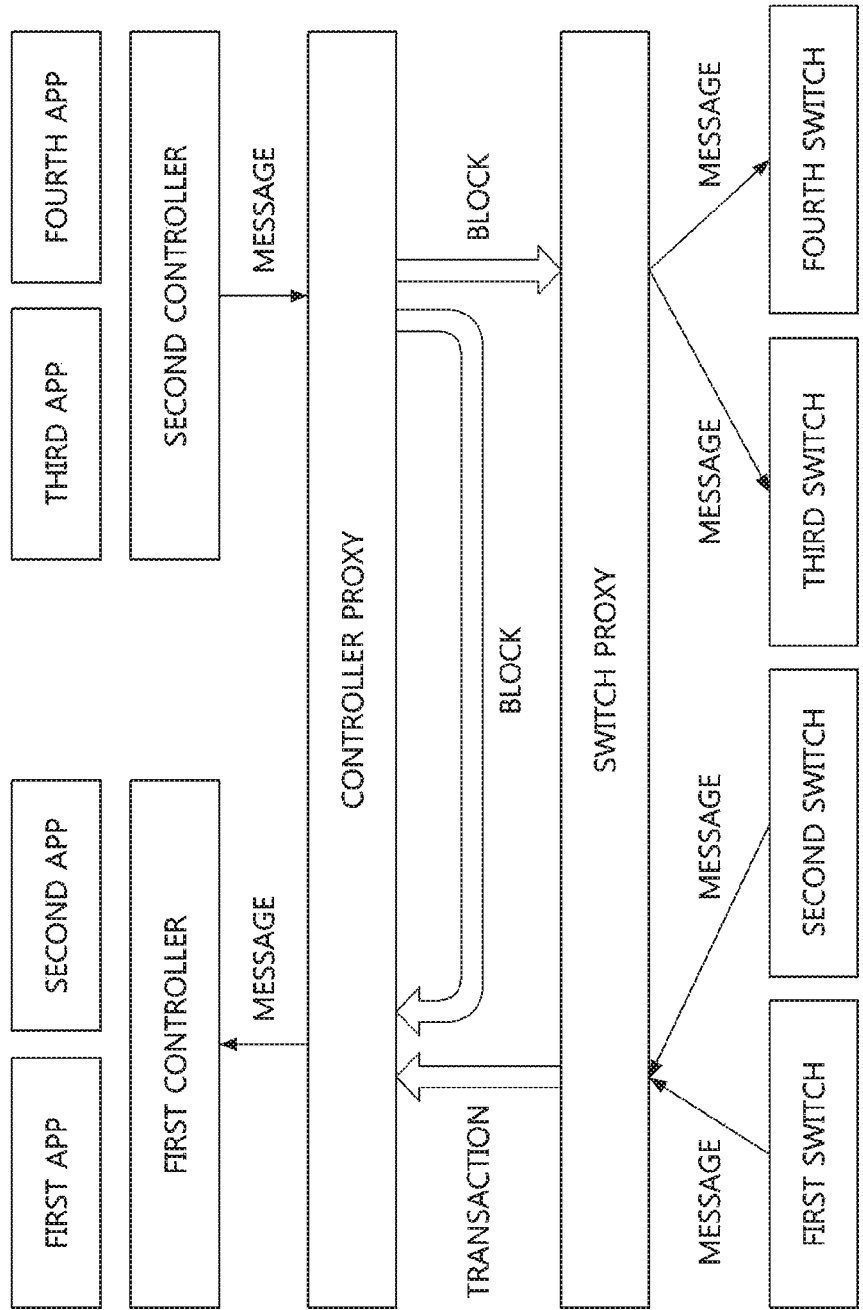
FIG. 3 is a conceptual diagram of a decentralized software-defined networking method implemented using proxies according to one embodiment of the present invention.

FIG. 3 is a conceptual diagram of a decentralized software-defined networking method implemented using proxies according to one embodiment of the present invention.

Referring to FIG. 3, the decentralized SDN according to the embodiment of the present invention may be implemented using a controller proxy and a switch proxy for conventional SDN controllers and SDN switches without additional devices or change. However, this is merely one example of implementation of the decentralized SDN according to the embodiment of the present invention, and the invention is not limited thereto.

Hereinafter, the controller proxy and the switch proxy for implementing the decentralized SDN will be described.

When the controller proxy receives a transaction or block, the controller proxy may convert the transaction or block into a message (switch-to-controller message) and forward the message to an SDN controller. In addition, when a message (controller-to-switch message) including network state information or the like is generated by the SDN controller, the controller proxy may generate a block reflecting the message and propagate the block over the network.

The switch proxy may receive a switch-to-controller message generated by an SDN switch, change (encapsulate) the message into a transaction, and propagate the transaction over the network. In addition, the switch proxy may receive a block, convert the block into a message (controller-to-switch message), and forward the message to the SDN switch.

Accordingly, an SDN controller that receives a transaction through the controller proxy may reflect a change of the network state based on the transaction and generate a switch command. In addition, an SDN controller that receives a block through the controller proxy may update the network state thereof based on the block. An SDN switch that receives a block through the switch proxy may execute the switch command included in the block, thereby controlling traffic.

Figure 4:
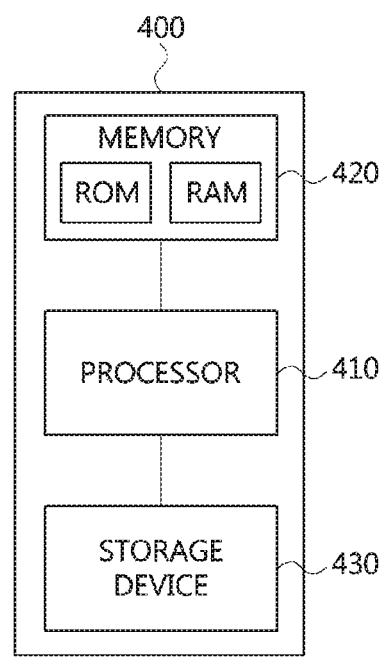
FIG. 4 is a block diagram of a decentralized software-defined network controller according to one embodiment of the present invention.

FIG. 4 is a block diagram of a decentralized software-defined network controller according to one embodiment of the present invention.

Referring to FIG. 4, a decentralized SDN controller 400 according to the embodiment of the present invention may include at least one processor 410, a memory 420, and a storage device 430.

The processor 410 may execute program commands stored in the memory 420 and/or the storage device 430. The processor 410 may refer to a central processing unit (CPU), a graphics processing unit (GPU), or a dedicated processor in which the methods according to the present invention are executed. The memory 420 and the storage device 430 may include a volatile storage medium and/or a non-volatile storage medium. For example, the memory 420 may include a read only memory (ROM) and/or a random access memory (RAM).

The memory 420 may store at least one command which is executed through the processor 410. The at least one command may include a command to receive a transaction including network event information from at least one SDN switch among a plurality of SDN switches, a command to determine a block generation entity with at least one other SDN controller based on a consensus algorithm, and a command to generate, when an SDN controller is determined as the block generation entity, a block including a transaction and propagate the transaction to at least one other SDN controller and the plurality of SDN switches.

The at least one command may further include a command to receive a block including a transaction when the SDN controller is not determined as the block generation entity.

More specifically, the processor 410 may propagate a block generated according to a command stored in the memory 420 to at least one other SDN controller and the plurality of SDN switches. Here, the processor 410 may propagate the generated block using either a broadcast technique or a multicast technique.

The processor 410 may receive a transaction including network event information from at least one other SDN switch of the plurality of SDN switches according to the command stored in the memory 420. Here, the processor 410 may generate a message based on the transaction through the controller proxy and receive the network event information via the message.

In addition, when the processor 410 is determined as a block generation entity according to the command stored in the memory 420, the processor 410 may generate a block including a transaction and propagate the block to at least one other SDN controller and the plurality of SDN switches. Here, the processor 410 may generate a block based on a message including a flow table through the controller proxy and propagate the block to at least one other SDN controller and the plurality of SDN switches.

Here, the network event information may include at least one of information about disconnection of a specific link, information about a flow table miss of a specific packet, and information about a timer event, and the consensus algorithm may include at least one of a sequential selection method, a random selection method, a method of selecting a leader, and proof of work. In addition, the block may include at least one of network state information and a switch command list.

Similar to the decentralized SDN controller, the decentralized SDN switch according to the embodiment of the present invention may include at least one processor, a memory, and a storage device.

The memory of the decentralized SDN switch may store at least one command that is executed through the processor. The at least one command may include a command to propagate a transaction including network event information to a plurality of SDN controllers when the network event information is obtained, a command to receive a block including a transaction and a flow table from one of the plurality of SDN controllers, and a command to control traffic based on the flow table.

More specifically, when the processor 410 obtains network event information according to a command stored in the memory 420, the processor 410 may propagate a transaction including the network event information to a plurality of SDN controllers. Here, the processor 410 may generate the transaction based on a message including the network event information through the switch proxy and propagate the transaction to a plurality of SDN controllers.

In addition, the processor 410 may receive a block including a transaction and a flow table from any one of the plurality of SDN controllers according to a command stored in the memory 420. Here, the processor 410 may generate a message including a flow table based on the block through the switch proxy and receive the flow table through the message.

Here, the network event information may include at least one of information about disconnection of a specific link, information about a flow table miss of a specific packet, and information about a timer event.

FIG. 5 is a flowchart illustrating operations of a decentralized software-defined networking method according to one embodiment of the present invention.

Referring to FIG. 5, in the decentralized SDN according to one embodiment of the present invention, at least one SDN switch may initially generate a transaction based on specific event information (S510) and propagate the generated transaction over the network (S520). Here, the specific event information may include at least one of information about disconnection of a specific link, information about a flow table miss of a specific packet, and information about a timer event but is not limited thereto. The propagation may be performed using either the broadcast technique or the multicast technique, but the present invention is not limited thereto.

Thereafter, a plurality of decentralized SDN controllers may receive the transaction and determine an SDN controller that is to generate a block among the plurality of decentralized SDN controllers based on a consensus algorithm (S530). Here, the consensus algorithm may include, but is not limited to, at least one of a sequential selection method, a random selection method, a method of selecting a leader, and proof of work.

The determined SDN controller may generate a block based on the received transaction (S540) and propagate the generated block over the network (S550). Here, the propagation may be performed using either the broadcast technique or the multicast technique, but the present invention is not limited thereto. In addition, the block may include, but is not limited to, at least one of network state information, a transaction list, and a switch command list.

Thereafter, at least one other SDN controller and at least one SDN switch may receive the block and obtain and reflect specific event information (S560). In other words, the SDN controllers that have not generated the block among the plurality of decentralized SDN controllers may receive the block and update the network state, and the SDN switch may receive the block and execute a switch command included in the block.

According to the present invention, a software-defined networking that allows byzantine faults can be provided.

According to the present invention, software-defined networking can be provided that is relatively less vulnerable to network partitioning.

According to the present invention, tamper-resistant network provenance can be provided.

While the example embodiments of the present invention and their advantages have been described in detail, it should be understood that various changes, substitutions and alterations may be made herein without departing from the scope of the invention.

What is claimed is:

1. A method of operating a software-defined network (SDN) controller located in a decentralized SDN including a plurality of SDN switches and a plurality of SDN controllers, the method comprising:
   receiving a transaction including network event information from at least one SDN switch of the plurality of SDN switches through a switch proxy;
   determining a block generation entity with at least one other SDN controller based on a consensus algorithm; and
   when the SDN controller is determined as the block generation entity, generating a block including the transaction and propagating the generated block to the at least one other SDN controller and the plurality of SDN switches,
   wherein the transaction is generated based on a message including the network event information.

2. The method of claim 1, further comprising when the SDN controller is not determined as the block generation entity, receiving a block including the transaction.

3. The method of claim 1, wherein the propagating of the generated block to the at least one other SDN controller and the plurality of SDN switches comprises propagating the generated block using either a broadcast technique or a multicast technique.

4. The method of claim 1, wherein the network event information comprises at least one of information about disconnection of a specific link, information about a flow table miss of a specific packet, and information about a timer event.

5. The method of claim 1, wherein the consensus algorithm comprises at least one of a sequential selection method, a random selection method, a method of selecting a leader, and proof of work.

6. The method of claim 1, wherein the block further comprises at least one of network state information and a list of switch commands.

7. The method of claim 1, wherein the receiving of the transaction including the network event information from the at least one SDN switch of the plurality of SDN switches comprises generating a message based on the transaction through a controller proxy and receiving the network event information via the message.

8. The method of claim 1, wherein, when the SDN controller is determined as the block generation entity, the generating of the block including the transaction and the propagating of the generated block to the at least one other SDN controller and the plurality of SDN switches comprises generating the block based on a message including a flow table through a controller proxy and propagating the block to the at least one other SDN controller and the plurality of SDN switches.

9. The method of claim 1, wherein the propagating of the generated block comprises generating a message including a flow table based on the block through the switch proxy and propagating the flow table via the message.

10. A method of operating a software-defined network (SDN) switch located in a decentralized SDN including a plurality of SDN switches and a plurality of SDN controllers, the method comprising:
    when obtaining network event information, propagating a transaction including the network event information to the plurality of SDN controllers;
    receiving a block including the transaction and a flow table from any one of the plurality of SDN controllers; and
    controlling traffic by reflecting the flow table,
    wherein the propagating of the transaction including the network event information to the plurality of SDN controllers when obtaining the network event information comprises generating the transaction based on a message including the network event information and propagating the transaction to the plurality of SDN controllers through a switch proxy.

11. The method of claim 10, wherein the network event information comprises at least one of information about disconnection of a specific link, information about a flow table miss of a specific packet, and information about a timer event.

12. The method of claim 10, wherein the receiving of the block including the transaction and the flow table from any one of the plurality of SDN controllers comprises generating a message including the flow table based on the block through a switch proxy and receiving the flow table via the message.

13. A software-defined network (SDN) controller located in a decentralized SDN including a plurality of SDN switches and a plurality of SDN controllers, the SDN controller comprising:
a processor; and
a memory storing at least one command which is executed through the processor,
wherein the at least one command is executed to:
receive a transaction including network event information from at least one SDN switch of the plurality of SDN switches through a switch proxy;
determine a block generation entity with at least one other SDN controller based on a consensus algorithm; and
when the SDN controller is determined as the block generation entity, generate a block including the transaction and propagate the block to the at least one other SDN controller and the plurality of SDN switches,
wherein the transaction is generated based on a message including the network event information.

14. The SDN controller of claim 13, wherein, when the SDN controller is not determined as the block generation entity, the at least one command is executed to receive a block including the transaction.

15. The SDN controller of claim 13, wherein the at least one command is executed to propagate the generated block using either a broadcast technique or a multicast technique.

16. The SDN controller of claim 13, wherein the network event information comprises at least one of information about disconnection of a specific link, information about a flow table miss of a specific packet, and information about a timer event.

17. The SDN controller of claim 13, wherein the consensus algorithm comprises at least one of a sequential selection method, a random selection method, a method of selecting a leader, and proof of work.

18. The SDN controller of claim 13, wherein the block further comprises at least one of network state information and a list of switch commands.

19. A method of operating a software-defined network (SDN) switch located in a decentralized SDN including a plurality of SDN switches and a plurality of SDN controllers, the method comprising:
when obtaining network event information, propagating a transaction including the network event information to the plurality of SDN controllers;
receiving a block including the transaction and a flow table from any one of the plurality of SDN controllers; and
controlling traffic by reflecting the flow table,
wherein the receiving of the block including the transaction and the flow table from any one of the plurality of SDN controllers comprises generating a message including the flow table based on the block through a switch proxy and receiving the flow table via the message.

* * * * *